Patented Sept. 15, 1931

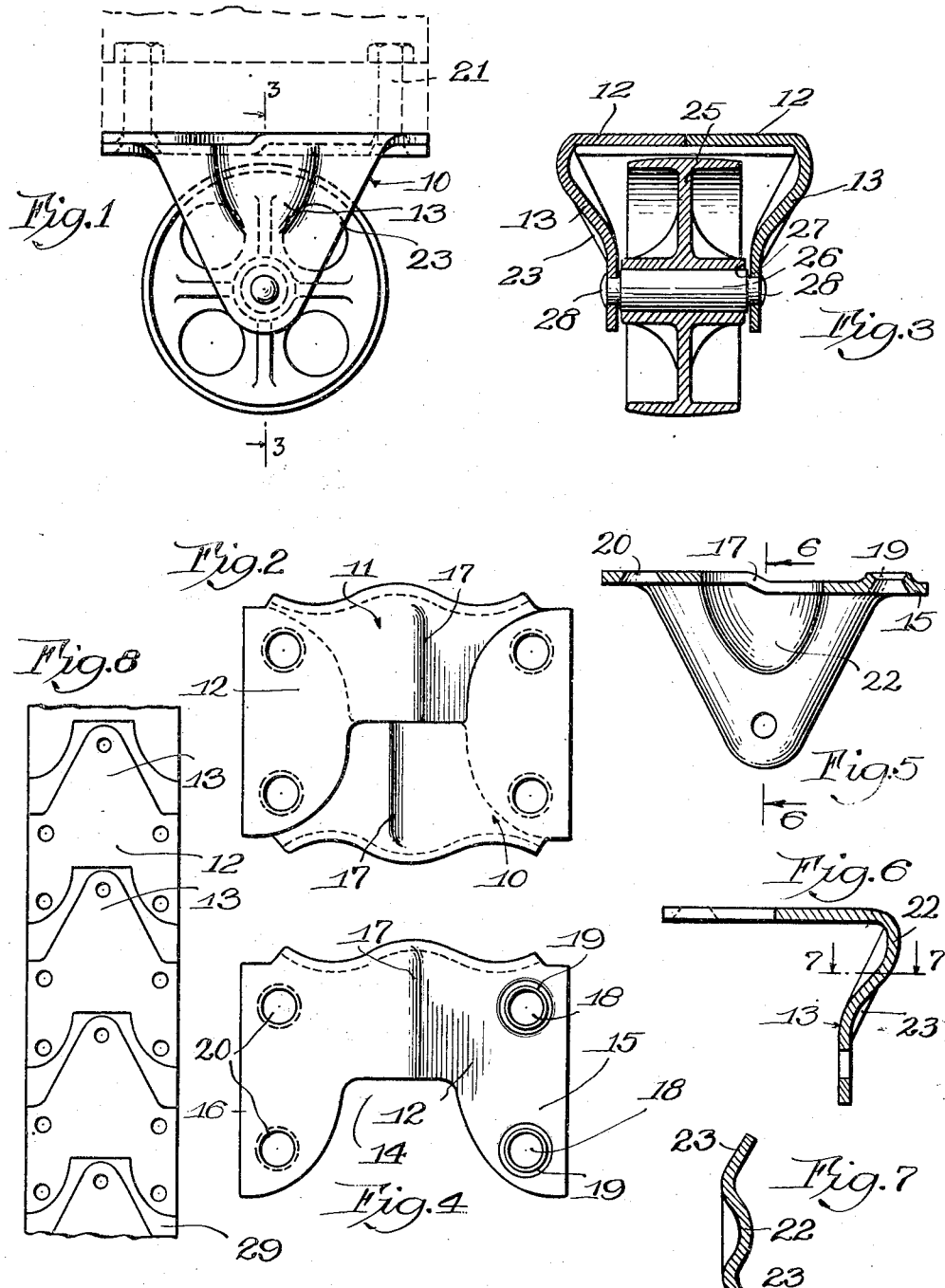

1,823,657

UNITED STATES PATENT OFFICE

ROBERT A. LACKEY, OF OAK PARK, ILLINOIS, ASSIGNOR TO THE PAYSON MANUFACTURING COMPANY, A CORPORATION OF ILLINOIS

CASTER

Application filed June 3, 1929. Serial No. 368,010.

This invention relates to improvements in casters.

The principal object of the invention is to provide a caster having a frame constructed of two similar parts so formed that they can be interfitted one with the other to form a rigid wheel carrying structure.

Another object of the invention relates to the provision of a caster, the frame members of which can be stamped from sheet metal if desired, the shape of the blanks being such that the amount of waste, as compared with any prior practice known to the applicant, is very substantially reduced.

Other objects relate to various features of construction, such as so shaping the legs of the frame members in cross-section as to suitably stiffen the same, which will be apparent from a consideration of the following specification and accompanying drawings, wherein Figure 1 is a side elevation of a caster or the like embodying the present invention.

Figure 2 is a top plan view thereof.

Figure 3 is a vertical sectional view taken on line 3—3 of Fig. 1.

Figure 4 is a plan view of one of the frame members.

Figure 5 is an elevation of one of the frame members partly broken away and looking toward the inner surface of the leg.

Figure 6 is a sectional view taken on line 6—6 of Figure 5.

Figure 7 is a transverse section taken on line 7—7 of Figure 6.

Figure 8 illustrates the nesting relation of the blanks of which the frame sections are formed whereby the wasting of material is substantially eliminated.

In the drawings, 10 indicates one frame member, and 11 the other, so designated for the purpose of convenience and description, but it will be understood that the members are identical in construction and may be formed by the same die if the frame is formed of sheet metal. Each frame section comprises a base portion 12 and the depending leg 13. A recess 14 extends inwardly from the side of the base opposite the leg 13, and defines a pair of ears or projections 15, 16.

As shown in Fig. 5, the base 12 is disposed in two planes by off-setting one portion of the base along the transverse line 17, which is substantially mid-way between the ends of the base. The ear 15 is shown provided with two holes 18, the metal of which is pressed upwardly around the circumference of the holes to form the circular ribs 19. The opposite half of the base is provided with holes 20 which are counter-sunk on the lower surface of the base, as shown in Figure 5. Any two such frame members can be interleaved one with the other, as shown in Figure 2, in which position the ear 16 of one section will overlie the ear 15 of the other, the circular ribs 19 of ear 15 seating in the counter-sunk openings 20. Through the aligned openings 18 and 20 suitable fastening means such as bolts 21 are passed for securing the caster to the truck or other structure or article of furniture to be supported thereby. The legs 13 have an outwardly pressed central portion 22 from the margins of which the side portions 23 of the leg flare outwardly slightly. This construction provides a substantially V-shaped depression 24 which very materially stiffens the legs.

The wheel 25 is mounted on an axle 26 carried by the legs 13, the axle preferably having its ends reduced slightly to form shoulders 27 between which and the riveted over ends 28, the ends of the legs 13 are firmly confined.

Where the caster wheels are provided with rubber tires which may occasionally require renewal, the riveting over of the ends 28 of the axle 26 may be omitted, whereby by loosening the bolts 21 the frame sections can be detached or loosened to permit the removal of the wheel.

As shown in Figure 8, the blanks of which the frame sections are formed can be cut from a sheet of material 29, without any considerable waste of the material between the blanks, as the ear portions 13 of one blank nests within the recess 14 of the preceding blank. This results in a saving of about thirty percent of waste material over any prior practice known to the applicant. By having the frame sections 13 of identical shape, the cost of dies is also reduced. Since one-half of the base is off-set from the other half by the distance equal to the thickness of the metal, the upper surface of the assembled caster frame lies in the same plane and presents a double thickness at the ends where the frame is attached to the truck or other article.

Although I have shown and described certain features of my improvements for the purpose of illustration, I do not wish to be restricted specifically to the disclosures except where so limited by the appended claims.

What I claim is:

1. A caster comprising a frame formed in two similar sections, each section comprising a base and a depending leg, each base being recessed at one side intermediate the ends and having the portion at one side of said recess offset from the plane of the corresponding portion at the opposite side of said recess whereby said bases can be inter-fitted with one portion of each base overlying the remaining portion of the other base, and a wheel carried by said legs.

2. A caster comprising a frame formed in two sections, each section comprising a base and a depending leg, each base having an open recess in the side thereof opposite the leg, and having substantially one-half thereof offset from the plane of the other portion whereby said bases can be telescoped with one portion of each overlying the remaining portion of the other, said base portions having registering openings for receiving fastening means, and a wheel carried by said legs.

3. A caster comprising a frame formed in two sections each comprising a base and a depending leg, each of said sections having a recess formed therein in the side opposite the respective leg and defining a pair of ears, one of said sections having its ears disposed in different but parallel planes whereby said other section can be interfitted therewith, with the ears in superimposed relation forming end portions of double thickness, said superimposed ears having registering openings for receiving securing means for securing said sections together at the top of the caster, an axle spanning said legs adjacent the free ends thereof and being provided with reduced ends on which said legs are confined and serving to secure said sections together at the lower end of the caster, and a wheel on said axle.

In testimony whereof, I have subscribed my name.

ROBT. A. LACKEY.